(12) United States Patent  
Gautier et al.

(10) Patent No.: US 9,118,260 B2  
(45) Date of Patent: Aug. 25, 2015

(54) CONTROL OF A SWITCH IN A POWER CONVERTER

(75) Inventors: Frédéric Gautier, Monnaie (FR); Bertrand Rivet, Vouvray (FR)

(73) Assignee: STMicroelectronics (Tours) SAS, Tours (FR)

( * ) Notice: Subject to any disclaimer, the term of this patent is extended or adjusted under 35 U.S.C. 154(b) by 350 days.

(21) Appl. No.: 13/619,533

(22) Filed: Sep. 14, 2012

(65) Prior Publication Data

US 2013/0107595 A1 May 2, 2013

(30) Foreign Application Priority Data

Oct. 27, 2011 (FR) ...................... 11 59751

(51) Int. Cl.
| | |
|---|---|
| *H02M 1/08* | (2006.01) |
| *H02M 7/5387* | (2007.01) |
| *H02P 27/08* | (2006.01) |
| *H02P 29/00* | (2006.01) |
| *H02M 1/00* | (2007.01) |

(52) U.S. Cl.  
CPC ............ *H02M 7/53871* (2013.01); *H02M 1/08* (2013.01); *H02P 27/085* (2013.01); *H02P 29/0088* (2013.01); *H02M 2001/0029* (2013.01); *H02M 2001/0054* (2013.01); *H02P 2207/01* (2013.01)

(58) Field of Classification Search  
CPC ............ H02M 2001/0029; H02M 2001/0054; H02M 1/08; H02M 1/084; H02M 1/088; H02M 7/5387; H02M 7/53871

USPC ............... 363/97, 98, 131, 132, 178; 323/285  
See application file for complete search history.

(56) References Cited

U.S. PATENT DOCUMENTS

| | | | |
|---|---|---|---|
| 6,476,683 B1 * | 11/2002 | Saito et al. ..................... 332/109 |
| 7,084,590 B2 * | 8/2006 | Miyamoto et al. ......... 318/400.3 |
| 7,728,568 B1 * | 6/2010 | Jain ............................... 323/272 |
| 7,990,740 B1 * | 8/2011 | Notohamiprodjo et al. .... 363/59 |
| 2005/0128671 A1 * | 6/2005 | Miyamoto ..................... 361/118 |
| 2005/0226298 A1 | 10/2005 | Asai |
| 2005/0281058 A1 * | 12/2005 | Batarseh et al. ................ 363/16 |
| 2007/0236197 A1 * | 10/2007 | Vo ................................. 323/282 |
| 2007/0296363 A1 | 12/2007 | Andrejak et al. |
| 2008/0001553 A1 * | 1/2008 | Qiu et al. ....................... 315/307 |
| 2008/0209236 A1 * | 8/2008 | Shaver et al. .................. 713/300 |
| 2009/0153111 A1 * | 6/2009 | Mao et al. ...................... 323/272 |
| 2009/0279336 A1 | 11/2009 | Erdman et al. |
| 2010/0194464 A1 * | 8/2010 | Deml ............................. 327/434 |
| 2010/0277151 A1 * | 11/2010 | Tsai et al. ...................... 323/283 |
| 2011/0122659 A1 * | 5/2011 | Duan et al. .................. 363/21.16 |
| 2012/0032709 A1 * | 2/2012 | Saotome et al. .............. 327/109 |
| 2012/0043950 A1 * | 2/2012 | Truong et al. ................. 323/282 |
| 2012/0112720 A1 * | 5/2012 | Remmert ....................... 323/283 |
| 2012/0146716 A1 * | 6/2012 | Shi et al. ....................... 327/540 |
| 2012/0169308 A1 * | 7/2012 | Dearborn et al. ............. 323/271 |

FOREIGN PATENT DOCUMENTS

| | | |
|---|---|---|
| EP | 1 580 862 A1 | 9/2005 |
| WO | WO 2006/093647 A1 | 9/2006 |
| WO | WO 2010022959 A1 * | 3/2010 |

* cited by examiner

*Primary Examiner* — Fred E Finch, III  
(74) *Attorney, Agent, or Firm* — Slater & Matsil, L.L.P.

(57) ABSTRACT

A method for controlling at least one switch in a power converter, wherein the switching speed of the switch dynamically varies according to a measurement of a quantity representative of the efficiency of the converter.

31 Claims, 3 Drawing Sheets

CONTROL OF A SWITCH IN A POWER CONVERTER

CROSS-REFERENCE TO RELATED APPLICATIONS

This application claims the priority benefit of French patent application number 1159751, filed on Oct. 27, 2011, which is hereby incorporated by reference to the maximum extent allowable by law.

TECHNICAL FIELD

The present invention generally relates to electronic circuits and, more specifically, to electric signal converters (power converters) using at least one switch switching according to a periodic cycle (chopper switch).

BACKGROUND

Many circuits are capable of converting or transforming an electric signal where the regulation of an output signal is ensured by switching one or several switches at a relatively high frequency, for example, greater than 1 kHz. The switches, for example, are transistors (MOS, IGBT, etc.) used in switched mode. By varying the switching frequency and duty cycle, it is possible to control the characteristics of the output signal (shape, frequency, power, voltage, etc.). Circuits of this type comprise, among others, switched-mode power supplies, D.C.-D.C. converters, circuits for correcting the power factor, inverters, converters for the generation of solar or wind electric power, etc.

FIG. 1 shows an example of a three-phase inverter circuit 10. In operation, circuit 10 receives a D.C. input voltage between two input terminals A and B, and delivers a three-phase A.C. signal on three output terminals C, D, and E. In this example, circuit 10 is used to power a three-phase asynchronous motor M.

Circuit 10 comprises six switches K1 to K6, for example, insulated-gate bipolar transistors (IGBT). Switches K1 and K2 are series-connected between terminals A and B. Switches K3 and K4 on the one hand, and K5 and K6 on the other hand, are also series-connected between terminals A and B in parallel with switches K1 and K2. Output terminals C, D, and E are respectively connected to the common node between switches K1 and K2, to the common node between switches K3 and K4, and to the common node between switches K5 and K6. Diodes D1 to D6 are respectively forward-connected between terminal C and terminal A, between terminal B and terminal C, between terminal D and terminal A, between terminal B and terminal D, between terminal E and terminal A, and between terminal B and terminal E. The control gates of switches K1 to K6 are respectively connected to output terminals $o_1$ to $o_6$ of a control circuit 12 (MCU), for example, a microcontroller.

In operation, microcontroller 12 imposes to switches K1 to K6 a switching sequence capable of transforming the D.C. voltage, applied on terminals A and B, into an averaged three-phase A.C. voltage provided on terminals C, D, and E. The switching frequency of the switches and the duty cycle of the switching may be dynamically modified (for example, via a user interface) to modify the characteristics of a three-phase A.C. signal supplied to the motor and thus vary the rotating speed thereof (speed variator). It should be noted that such a circuit may also be used to convert the electric power generated by a current generator.

Diodes Di (with i ranging from 1 to 6) are so-called free-wheel diodes, enabling to ensure the continuity of the current in the inductive elements of motor M on turning-off (blocking) of switches Ki. Diodes Di especially enable to avoid for abrupt voltage peaks to be applied across the switches on each turning-off of a switch Ki.

Generally, in conversion circuits using a chopper switch, a diode is often associated with the switch to provide a secondary conduction path to the current when the switch is turned off.

A disadvantage of converters using a chopper switch in hard switching associated with a free wheel diode (PN junction) (for example, in an assembly comprising an inductive element, a chopper switch, and a free wheel diode) is the power loss due to a charge recovery phenomenon occurring each time the diode switches from an on state to an off state (that is, on each turning-on of the switch).

FIG. 2 schematically shows the time variation of currents $I_{TR}$ and $I_D$, respectively in a chopper switch (transistor) and in a diode associated with this switch, on blocking of the diode (turning-on of the switch). It is assumed that at a time t0, the switch is controlled to be turned on. The switch starts conducting. Current $I_D$ in the diode then decreases from a value IF corresponding to the forward current through the diode before blocking, to a negative value IRM (reverse mode current), before increasing to cancel. The variation of current $I_{TR}$ in the switch is opposite to that of current $I_D$, that is, current $I_{TR}$ increases from an approximately zero value (off switch) to a maximum value (peak) before decreasing to a stabilized value IF (on switch). Duration trr between a time t1, subsequent to t0 and a time t2, subsequent to t1, during which the diode conducts a reverse current (and the switch conducts a current greater than the steady-state current), is called reverse recovery time. This duration is necessary to drain off the remaining stored charges when the forward current cancels (time t1). Such remaining charges are called recovered charges. Quantity Qrr of recovered charges can be defined as being the time integration of the reverse current crossing the diode on blocking thereof (hatched area in FIG. 2). Quantity Qrr of recovered charges depends on several factors and, in particular, on the intensity of current IF crossing the diode on blocking thereof, on the current decrease slope on blocking thereof (linked to the current growth slope in the transistor when it is turned on, that is, in time interval toff between time t0 and time t1), on the junction temperature in operation, and on the voltage applied in reverse mode to the diode to block it. This recovery phenomenon characteristic of PN junctions is all the greater as the reverse breakdown voltage of the diode is high. The recovered charges are dissipated in heat in the switch and do not take part in the output signal generation. The loss due to recovered charges amounts for a significant part of the total loss in converters of this type.

It would be desirable to decrease the power loss in converters using one or several chopper switches and, more specifically, the loss due to the charge recovery phenomenon in diodes associated with chopper switches. More generally, it would be desirable to optimize the operation of converters using at least one chopper switch associated with a free wheel diode.

SUMMARY OF THE INVENTION

An embodiment overcomes all or part of the disadvantages of power converters using at least one chopper switch.

An embodiment minimizes the power loss in converters using at least one chopper switch.

Another embodiment provides a method for controlling a chopper switch in a circuit for converting or transforming an electric signal.

Thus, an embodiment provides a method for controlling at least one switch in a power converter, wherein the switching speed of the switch dynamically varies according to a measurement of a quantity representative of the efficiency of the converter.

According to an embodiment, the measured quantity is a ratio of the power received as an input by the converter to the power provided at the output of the converter.

According to an embodiment, the measured quantity is a temperature measured by a sensor placed close to the converter.

According to an embodiment, the switching speed of the switch is controlled by the measured quantity, the switching speed variations being selected to maximize the power efficiency of the converter.

According to an embodiment, the method comprises successive iterations and, for each iteration, the switching speed is modified by one increment and the quantity is measured.

According to an embodiment, for each iteration, if the variation of the measured quantity is representative of a decrease in the efficiency with respect to the iteration of previous rank, the sign of the increment is modified, otherwise the sign of the increment is maintained unchanged.

Another embodiment provides a power converter comprising at least one chopper switch, and a circuit for controlling the switch according to the above-mentioned method.

According to an embodiment, the converter comprises at least one diode connected to the switch.

According to an embodiment, the switching speed of the switch is settable via a variable resistor connected to its control gate.

According to an embodiment, the control means comprise a microcontroller.

According to an embodiment, the converter comprises: first and second switches in series between first and second terminals of application of a D.C. voltage; in parallel, third and fourth switches in series between the first and second terminals; in parallel, fifth and sixth switches in series between the first and second terminals; and first to sixth diodes respectively in parallel with the first to sixth switches.

According to an embodiment, the converter is capable of operating as a three-phase inverter for the control of a motor or of a current generator.

BRIEF DESCRIPTION OF THE DRAWINGS

Features and advantages will be discussed in detail in the following non-limiting description of specific embodiments in connection with the accompanying drawings.

The same elements have been designated with the same reference numerals in the different drawings. For clarity, only those elements which are useful to the understanding of the present invention have been shown and will be described. Further, FIGS. 2 to 5 have been drawn out of scale.

DETAILED DESCRIPTION OF ILLUSTRATIVE EMBODIMENTS

Studies conducted by the present inventors have shown that the power loss (and accordingly the power efficiency) in a converter using a chopper switch associated with a diode (PN junction) varies according to the current decrease slope in the diode on blocking thereof (or decrease slope of the current in the switch on turning-on thereof). This can be partly explained by the fact that the magnitude of the recovered charge phenomenon in the diode depends on the decrease slope of the current in the diode on blocking thereof. This dependency is illustrated by FIGS. 3 and 4.

Figure 2:
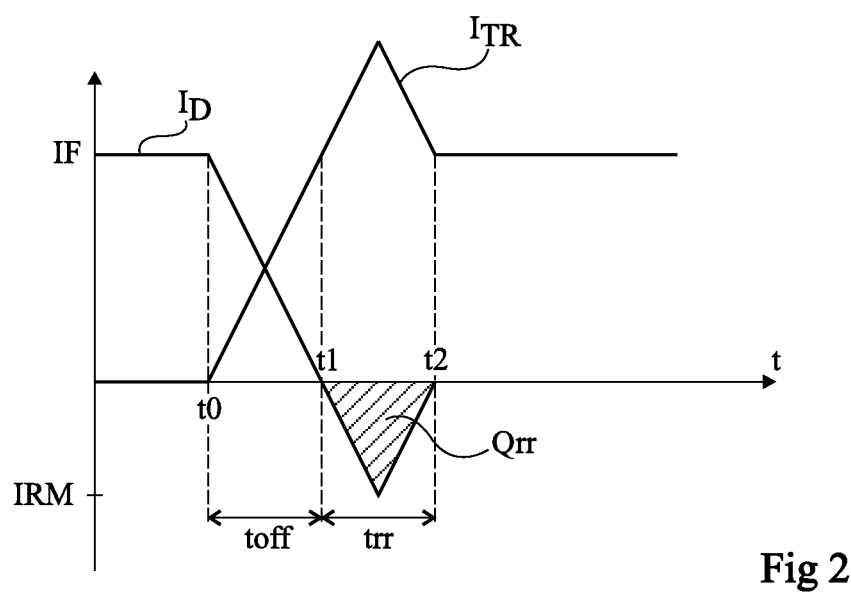
FIG. 2 is a timing diagram schematically showing the variation of the current in a switch and in a diode associated with this switch on blocking of the diode (turning-on of the switch)
Figure 3:
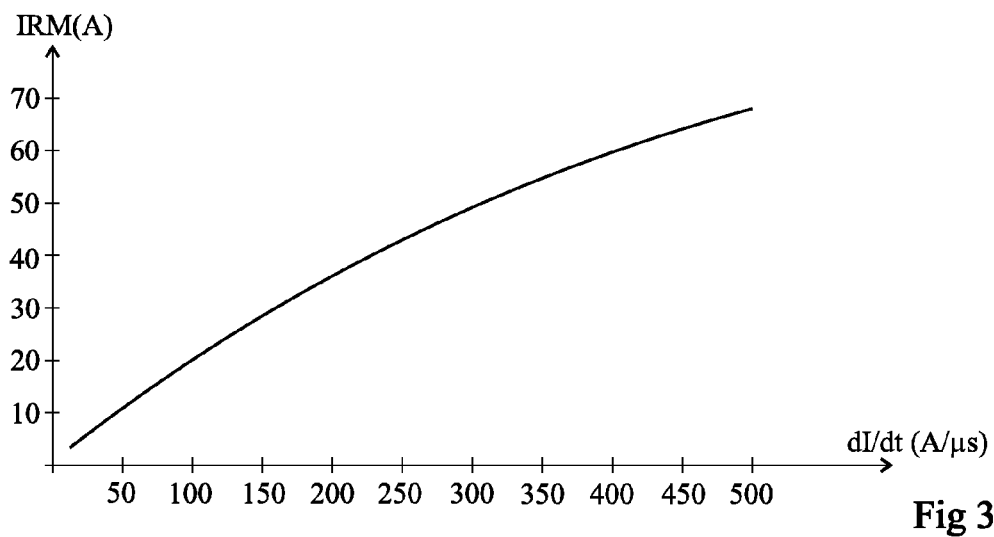
FIG. 3 is a diagram schematically showing the variation of negative peak voltage IRM of the current in a diode on blocking thereof, according to the current decrease slope in the diode on blocking thereof.

FIG. 3 is a diagram schematically showing the variation of negative peak voltage IRM (see FIG. 2) of the current in a diode on blocking thereof, according to decrease slope dI/dt of the current. Peak voltage IRM is shown in amperes (A), in absolute value, and current decrease slope dI/dt is shown in amperes per microsecond (A/µs). The diagram of FIG. 3 shows that peak value IRM increases (in absolute value) when slope dI/dt increases (according to a non-linear increase slope). In this example, peak value IRM switches from approximately 10 A for a slope dI/dt of approximately 50 A/µs, to approximately 65 A for a slope dI/dt of approximately 500 A/µs.

Figure 4:
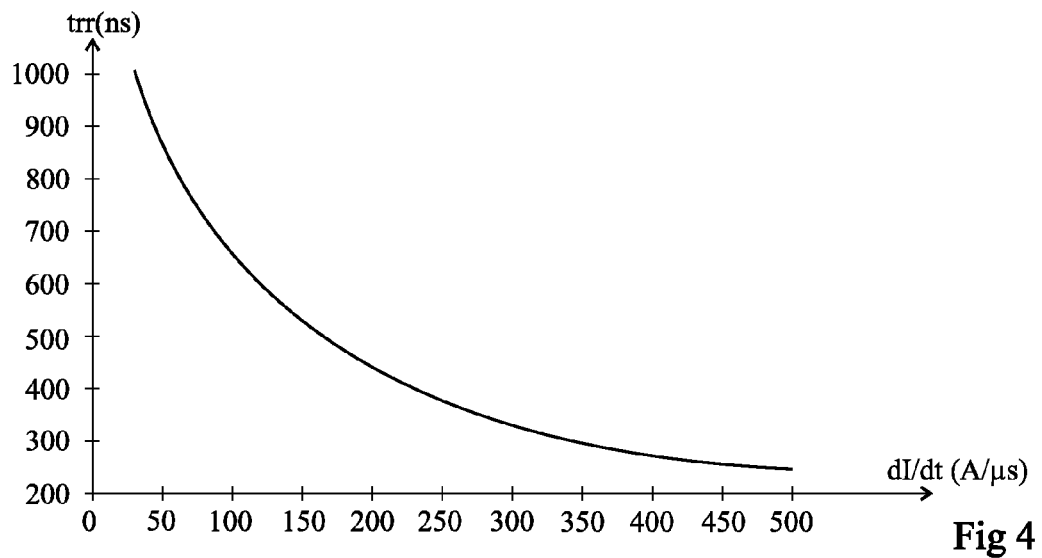
FIG. 4 is a diagram schematically showing the variation of negative recovery time trr of a diode on blocking thereof, according to the current decrease slope in the diode on blocking thereof.

FIG. 4 is a diagram schematically showing the variation of recovery time trr (see FIG. 2) of the diode, according to decrease slope dI/dt of the current in the diode on blocking thereof. Recovery time trr is shown in nanoseconds (ns). The diagram of FIG. 4 shows that recovery time trr decreases when slope dI/dt increases (according to a non-linear decrease slope). In this example, time trr switches from approximately 100 ns for a slope dI/dt of 50 A/µs, to approximately 250 ns for a slope dI/dt of 500 A/µs.

Thus, when slope (dI/dt) increases, durations toff between times t0 and t1 and trr between times t1 and t2 decrease, but negative value IRM of the current in the diode increases (see FIG. 2). There thus exist optimal switching conditions for which the loss due to the diode is minimum.

Figure 1:
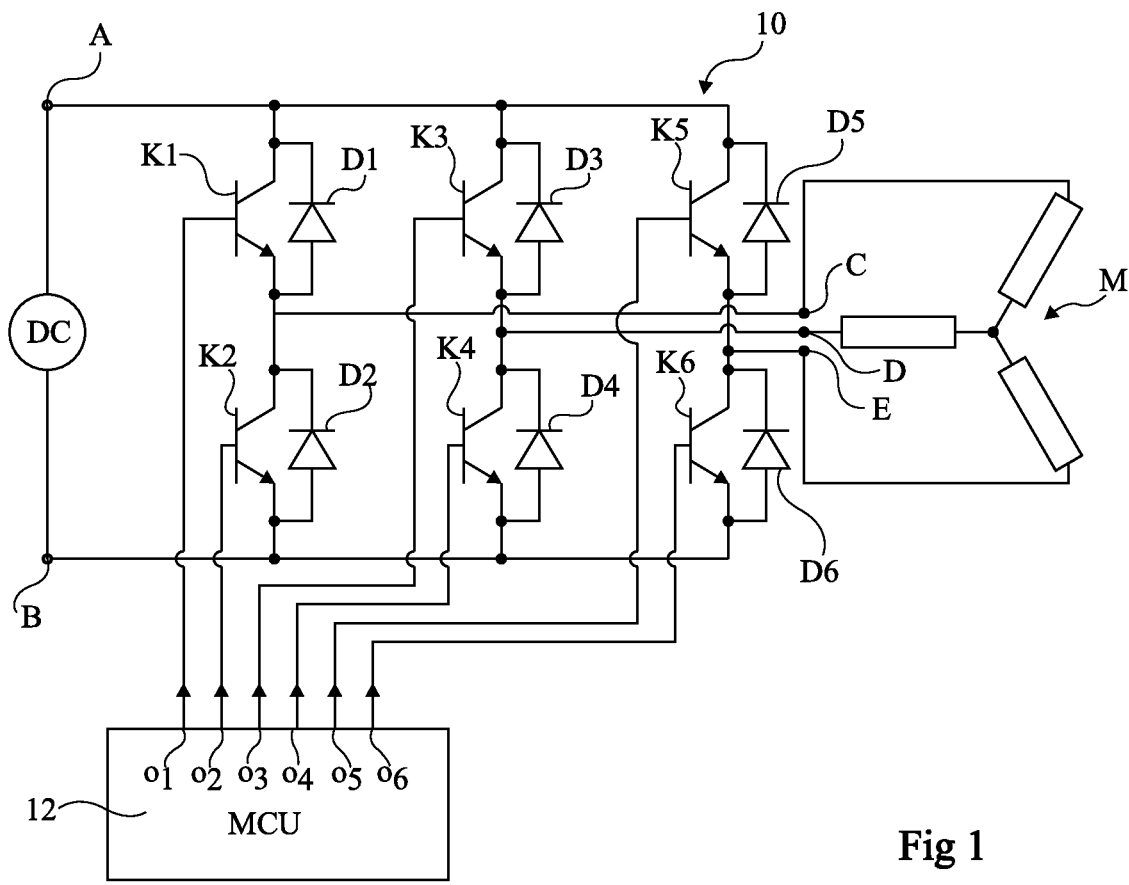
FIG. 1 is an electric diagram of an example of a three-phase inverter circuit using chopper switches.

For a given converter, it could be envisaged to determine, by empirical measurements or by simulation, an optimal slope dI/dt, that is, a slope dI/dt for which the loss due to the diode is minimum, or, more generally, a slope dI/dt for which the total power loss in the converter is minimum. Decrease slope dI/dt of the current in the diode could then be forced to its optimal value. A way to force the dI/dt to its optimum value is to vary the chopper switch switching speed (current increase slope in the switch). To achieve this, a resistor may be provided between the output terminal of the control circuit of the chopper switch (terminal $o_i$ of circuit 12 in the example of FIG. 1) and the switch control gate.

However, the present inventors have observed that in practice, optimal slope dI/dt in a converter using a chopper switch associated with a diode depends on many factors and tends to fluctuate. For example, optimal slope dI/dt varies according to the conditions of use of the converter and, in particular, according to its charge and to its operating temperature and according to the dispersion of the characteristics of the components due to manufacturing process uncertainties.

Figure 5:
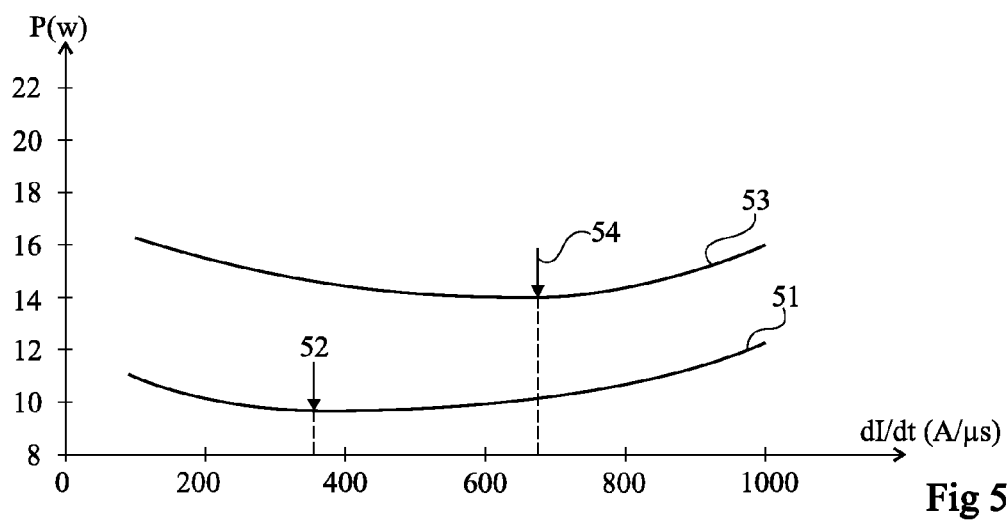
FIG. 5 schematically shows the variation, in a converter using a chopper switch associated with a diode, of the power loss due to the diode according to the current decrease slope in the diode on blocking thereof.

FIG. 5 is a diagram schematically showing, in a converter using a chopper switch associated with a diode, the variation of power loss P in watts (W) due to the diode according to slope dI/dt of the current decrease in the diode on blocking thereof. In this example, the converter is a three-phase inverter of the type described in relation with FIG. 1, powering a motor. The diagram of FIG. 5 comprises two curves 51 and 53, respectively showing the variation of loss P in the inverter powering an idling motor, and the variation of loss P in the inverter powering the same motor driving a load (for example, a vehicle).

It can be observed that the loss in the inverter depends on the motor load and, above all, that optimal slope dI/dt in terms of efficiency significantly varies according to the motor load. In this example, optimal slope dI/dt when the motor is idling (arrow 52 in the drawing) is approximately 375 A/μs. However, when the motor drives a load, optimal slope dI/dt (arrow 54 in the drawing) is approximately 675 A/μs.

It is here provided, in a converter using a chopper switch associated with a diode, to dynamically adjust (that is, continuously or periodically during the converter operation) slope dI/dt according to a measurement of a quantity representative of the power efficiency of the converter. More specifically, it is provided to control slope dI/dt with a measurement of the efficiency by using an algorithm for searching the point of maximum efficiency of the converter.

To dynamically vary decrease slope dI/dt of the current in the diode, it is provided to dynamically vary the switching speed of the chopper switch(es), for example, by means of variable resistors, or by using a variable current generator.

As an example, the quantity measured for the control may be any of the power measured at the converter output to the power measured at the converter input. For this purpose, devices for measuring the current and the voltage at the input and at the output of the converter may be provided. A calculator or any other adapted device may be provided to determine the efficiency, it being understood that the powers at the converter input and output are respectively equal to the product of the input current by the input voltage, and to the product of the output current by the output voltage.

As a variation, the quantity representative of the power efficiency of the converter may be the temperature of the converter circuit, or the temperature inside of a protection package of the converter circuit. Indeed, the electric power lost in the converter is generally integrally turned into heat. The temperature variations thus quite faithfully reflect converter power efficiency variations (assuming a certain stability of the ambient temperature during a period of use of the converter). To perform such a measurement, a simple temperature sensor may be provided, for example, on heat dissipators (generally present in converters of this type), or on a component of the converter (diode, switch, or other component).

Figure 6:
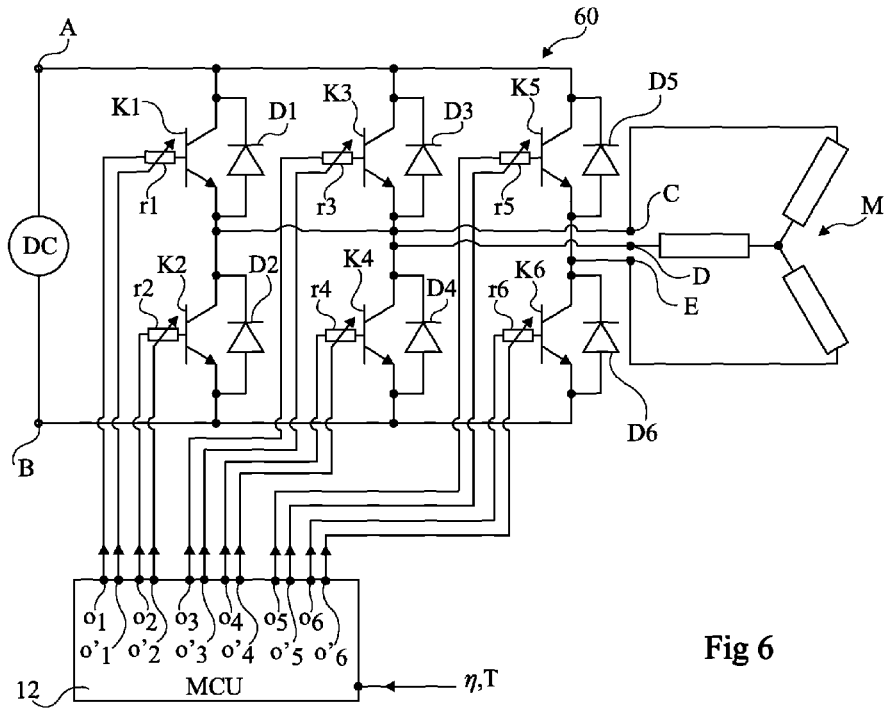
FIG. 6 is an electric diagram of an embodiment of a three-phase inverter circuit using chopper switches.

FIG. 6 is an electric diagram of an embodiment of a three-phase inverter circuit 60 using chopper switches. Circuit 60 comprises the same elements as circuit 10 of FIG. 1. It differs from circuit 10 especially in that variable resistors r1 to r6 respectively connect the control gates of switches K1 to K6 (IGBTs in this example) to output terminals $o_1$ to $o_6$ of control circuit 12 (MCU). The control terminals of variable resistors r1 to r6 are respectively connected to output terminals $o_1'$ to $o_6'$ of circuit 12. Further, means, not shown, are provided to dynamically measure a quantity representative of the power efficiency of the converter. The measurement means for example comprise devices for measuring the converter input and output voltages and currents, to directly measure efficiency η of the converter, or one or several sensors of temperature T of the converter. Control circuit 12, for example, a microcontroller, receives the measured quantity, that is, efficiency η and/or temperature T in this example, via an input terminal IN of the microcontroller.

In operation, circuit 12 imposes to switches K1 to K6 a switching sequence capable of transforming the D.C. voltage, applied on terminals A and B, into an averaged three-phase A.C. voltage provided on terminals C, D, and E. Further, circuit 12, or calculator (microcontroller, DSP, etc.) is programmed to dynamically vary the value of variable resistors r1 to r6, and thus the switching speed of switches K1 to K6, according to the quantity representative of the efficiency, received on terminal i. In a preferred embodiment, the microcontroller is programmed to dynamically vary the switching speed of switches Ki (with i ranging from 1 to 6) according to an algorithm for searching an optimal operating point, that is, a point for which measured efficiency η is maximum, and/or for which measured temperature T is minimum.

Figure 7:
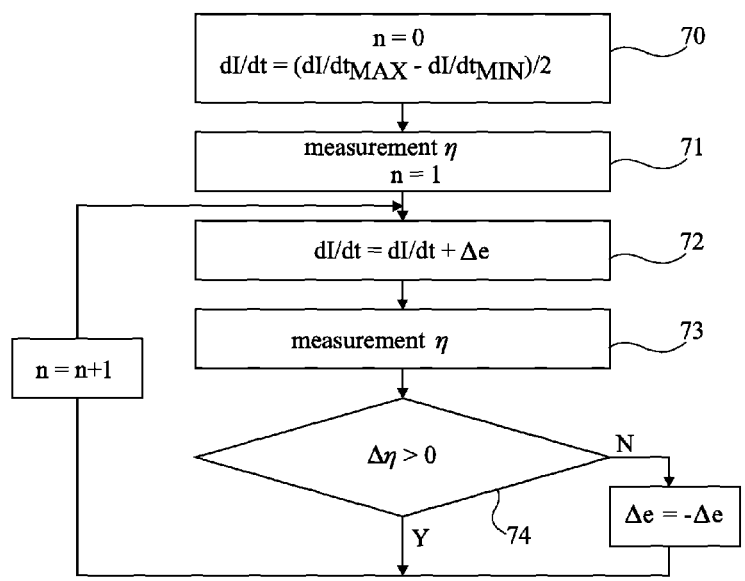
FIG. 7 is a flowchart illustrating an embodiment of a method for controlling a chopper switching a power converter.

FIG. 7 is a block diagram illustrating the operation of an embodiment of such an algorithm for searching an optimal operating point in terms of efficiency. This is an iterative algorithm in which, for each iteration, the switching speed of the switch is modified by one increment, and the power efficiency is measured. If the efficiency variation with respect to the iteration of previous rank is negative, the sign of the increment is modified, otherwise the sign of the increment is maintained unchanged.

In an initialization step 70 (iteration n=0), switching speed dI/dt is set to an average value between limiting values $dI/dt_{MIN}$ and $dI/dt_{MAX}$ (for example, $dI/dt=(dI/dt_{MAX}-dI/dt_{MIN})/2$). Power efficiency η of the converter is then measured at a step 71, and an iteration counter is incremented (n=1).

Then starts an iterative operation in which, for each iteration, a step 72 of setting of the switching speed of the switch to a value dI/dt=dI/dt+Δe is provided, where Δe is an incrementation step selected according to the desired control accuracy. Power efficiency η of the converter is then measured at a step 73. If the efficiency variation with respect to the iteration of previous rank is positive (efficiency increase), the sign of increment Δe is maintained unchanged (step 74). Conversely, if the efficiency variation is negative (efficiency decrease), the sign of increment Δe is changed (Δe=−Δe).

At each iteration, steps 72 to 74 are repeated, which enables to control the switching speed of the switch with the efficiency measurement, by permanently trying to come close to an optimal switching speed in terms of efficiency.

The described method may be implemented during the entire converter operating time (in nominal state). The time interval between two successive iterations of the algorithm may be selected according to the desired control performance, and according to the availability of the microcontroller or of the used control unit. In all cases, the time interval between two successive iterations should be sufficient to enable modification of the switching speed of the switch and to measure the efficiency with the new speed (taking into account the thermal inertia of the converter in the case where the measurement representative of the efficiency is a temperature measurement). The time interval between two successive iterations for example ranges between 0.1 and 10 s. Any other time interval may however be envisaged according to the targeted power efficiency optimization performance.

The method described in relation with FIG. 7 may be adapted to a control by a measurement of the converter temperature.

In the case of a converter using several chopper switches (such as the inverter described in relation with FIG. 6), a method of control according to an algorithm of the type described in relation with FIG. 7 in which all switches Ki are simultaneously set at the same switching speed for each iteration of the algorithm may be provided. As a variation, a control in several phases may be provided. In a first phase, all switches Ki are simultaneously set to the same switching speed for each iteration of the algorithm. Finally, fine setting phases may be provided, in which the switching speed of a single switch is modified at each iteration of the algorithm.

An advantage of the method for controlling a chopper switch described hereabove is that it enables to optimize the operation, and especially the power efficiency, of the converter.

Further, this method is easy to implement. In particular, in converters already provided with a calculator (microcontroller, DSP, etc.) for controlling the switching frequency and the switching duty cycle of the switch(es), it is sufficient to provide means for controlling the dI/dt (variable resistor, variable current generator, or other device), and to program in adapted fashion the calculator to dynamically adjust the dI/dt. As a variation, circuits (control unit) dedicated to the implementation of this method may be provided.

The described method may be implemented by hardware or software means or a combination thereof.

Specific embodiments of the present invention have been described. Various alterations, modifications and improvements will readily occur to those skilled in the art.

In particular, the present invention is not limited to the example described in relation with FIG. 6 in which the switching speed of a chopper switch is set via a variable resistor connected to its control gate. Any other means for controlling the dI/dt of a switch and/or of a diode associated with this switch may be used. Another way is to use a controllable current generator for example comprising a first PNP-type bipolar transistor having its emitter connected to a terminal of application of a positive voltage and its collector connected to the control gate of the switch, and a second NPN-type bipolar transistor having its emitter connected to ground and having its collector connected to the base of the first bipolar transistor, the base of the second bipolar transistor being controlled by a digital-to-analog converter (for example, the microcontroller). Further, the present invention is not limited to the case where the switch is a MOS or IGBT transistor. Any other adapted power switch may be used.

Further, the present invention is not limited to the example of an algorithm for searching an optimal operating point in terms of efficiency, described in relation with FIG. 7. Any other method for controlling a chopper switch comprising a dynamic variation of the switching speed of the switch according to a measurement of a quantity representative of the power efficiency of the converter may be used.

Further, the present invention is of course not limited to the example described in relation with FIG. 6 in which the converter is a three-phase inverter for controlling a motor. The provided control method may be used in any other converter using a chopper switch.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for controlling at least one switch with a parallel connected free-wheeling diode in a power converter, the method comprising:
   determining a measured quantity representative of a power efficiency of the power converter; and
   dynamically varying a switching slope dI/dt of the at least one switch with the parallel connected free-wheeling diode based on the measured quantity, wherein
      the switching slope dI/dt of the at least one switch with the parallel connected free-wheeling diode is dynamically varied in order to approach an optimum of the power efficiency of the power converter with respect to the switching slope dI/dt of the at least one switch with the parallel connected free-wheeling diode, and
      dynamically varying the switching slope dI/dt of the at least one switch with the parallel connected free-wheeling diode adjusts a magnitude of recovered charges dissipated in the free-wheeling diode.

2. The method of claim 1, wherein the measured quantity is a ratio of the power received as an input by the converter to the power provided at an output of the converter.

3. The method of claim 1, wherein the measured quantity represents a temperature measured by a sensor placed close to the converter.

4. The method of claim 1, wherein the method is performed in successive iterations and wherein, for each iteration, the switching slope dI/dt is modified by one increment and the measured quantity is determined.

5. The method of claim 4, wherein for each iteration, if a variation of the measured quantity is representative of a decrease in the power efficiency with respect to the iteration of a previous rank, a sign of the increment is modified, otherwise the sign of the increment is maintained unchanged.

6. A power converter comprising:
   at least one chopper switch;
   at least one free-wheeling diode connected in parallel with the at least one chopper switch; and
   a control circuit coupled to the chopper switch, the control circuit configured to
      determine a measured quantity representative of a power efficiency of the power converter, and
      dynamically vary a switching slope dI/dt of the at least one chopper switch based on the measured quantity, wherein
         the switching slope dI/dt of the at least one chopper switch is dynamically varied in order approach an optimum of the power efficiency of the power converter with respect to the switching slope dI/dt of the at least one chopper switch, and
         dynamically varying the switching slope dI/dt of the at least one chopper switch adjusts a magnitude of recovered charges dissipated in the at least one free-wheeling diode.

7. The power converter of claim 6, wherein the switching slope dI/dt of the at least one chopper switch is settable via a variable resistor connected to a control gate.

8. The power converter of claim 6, wherein the control circuit comprises a microcontroller.

9. The power converter of claim 6, wherein
   the at least one chopper switch comprises:
      a first switch and a second switch coupled in series between a first terminal and a second terminal;

a third switch and a fourth switch coupled in series between the first and second terminals, wherein the third and fourth switches are parallel with the first and second switches; and a fifth switch and a sixth switch coupled in series between the first and second terminals, wherein the fifth and sixth switches are parallel with the first and second switches; and the at least one free-wheeling diode comprises:

a first free-wheeling diode coupled in parallel with the first switch;

a second free-wheeling diode coupled in parallel with the second switch;

a third free-wheeling diode coupled in parallel with the third switch;

a fourth free-wheeling diode coupled in parallel with the fourth switch;

a fifth free-wheeling diode coupled in parallel with the fifth switch; and a sixth free-wheeling diode coupled in parallel with the sixth switch.

10. The power converter of claim 9, further comprising a DC voltage source coupled between the first terminal and the second terminal.

11. The power converter of claim 10, wherein the converter is configured to operate as a three-phase inverter for the control of a motor or of a current generator.

12. The power converter of claim 11, wherein the control circuit comprises a microcontroller.

13. The power converter of claim 9, wherein the switching slope dI/dt of the first, second, third, fourth, fifth, and sixth switches is varied by varying a resistance of an associated variable resistor.

14. The power converter of claim 6, wherein the measured quantity is a ratio of the power received as an input by the converter to the power provided at an output of the converter.

15. The power converter of claim 6, wherein the measured quantity represents a temperature measured by a sensor located near the power converter.

16. The power converter of claim 6, further comprising a temperature sensor located near the power converter, wherein the measured quantity represents a temperature measured by the temperature sensor.

17. A power converter comprising:

a first DC terminal;

a second DC terminal;

a first output terminal;

a second output terminal;

a third output terminal;

a first switch with a current path coupled between the first DC terminal and the first output terminal;

a first free-wheeling diode coupled in parallel with the current path of the first switch;

a first variable resistor coupled to a control input of the first switch;

a second switch with a current path coupled between the second DC terminal and the first output terminal;

a second free-wheeling diode coupled in parallel with the current path of the second switch;

a second variable resistor coupled to a control input of the second switch;

a third switch with a current path coupled between the first DC terminal and the second output terminal;

a third free-wheeling diode coupled in parallel with the current path of the third switch;

a third variable resistor coupled to a control input of the third switch;

a fourth switch with a current path coupled between the second DC terminal and the second output terminal;

a fourth free-wheeling diode coupled in parallel with the current path of the fourth switch;

a fourth variable resistor coupled to a control input of the fourth switch;

a fifth switch with a current path coupled between the first DC terminal and the third output terminal;

a fifth free-wheeling diode coupled in parallel with the current path of the fifth switch;

a fifth variable resistor coupled to a control input of the fifth switch;

a sixth switch with a current path coupled between the second DC terminal and the third output terminal;

a sixth free-wheeling diode coupled in parallel with the current path of the sixth switch; and a sixth variable resistor coupled to a control input of the sixth switch a control circuit that is configured to dynamically vary a switching slope dI/dt of the six switches based on a measured quantity representative of a power efficiency of the power converter, wherein the switching slope dI/dt of the six switches is dynamically varied in order approach an optimum of the power efficiency of the power converter with respect to the switching slope dI/dt of the six switches, and dynamically varying the switching slope dI/dt of the six switches adjusts a magnitude of recovered charges dissipated in the six free-wheeling diodes.

18. The power converter of claim 17, wherein the control circuit has a plurality of outputs, each output coupled to a respective one of the variable resistors.

19. The power converter of claim 18, wherein the outputs of the control circuit comprise:

a first output, wherein the first variable resistor has a current path coupled between the first output of the control circuit and the control input of the first switch;

a second output, wherein the second variable resistor has a current path coupled between the second output of the control circuit and the control input of the second switch;

a third output, wherein the third variable resistor has a current path coupled between the third output of the control circuit and the control input of the third switch;

a fourth output, wherein the fourth variable resistor has a current path coupled between the fourth output of the control circuit and the control input of the fourth switch;

a fifth output, wherein the fifth variable resistor has a current path coupled between the fifth output of the control circuit and the control input of the fifth switch; and a sixth output, wherein the sixth variable resistor has a current path coupled between the sixth output of the control circuit and the control input of the sixth switch.

20. The power converter of claim 19, wherein the outputs of the control circuit further comprise:

a first control output coupled to a control input of the first variable resistor;

a second control output coupled to a control input of the second variable resistor;

a third control output coupled to a control input of the third variable resistor;

a fourth control output coupled to a control input of the fourth variable resistor;

a fifth control output coupled to a control input of the fifth variable resistor; and a sixth control output coupled to a control input of the sixth variable resistor.

21. The power converter of claim 17, wherein the control circuit comprises a microcontroller.

22. The power converter of claim 17, wherein the switching slope dI/dt of the six switches is varied by varying a resistance of an associated variable resistor.

23. The power converted of claim 22, wherein the switching slope dI/dt of the six switches comprises six separately controlled switching slopes dI/dt, each of the six switches having a switching slope dI/dt, wherein the switching slope dI/dt for each switch of the six switches is varied by varying the resistance of the associated variable resistor.

24. The power converter of claim 17, wherein the measured quantity is a ratio of the power received as an input by the converter to the power provided at the output of the converter.

25. The power converter of claim 17, wherein the measured quantity represents a temperature measured by a sensor located near the power converter.

26. The power converter of claim 17, further comprising a temperature sensor located near the power converter, wherein the measured quantity represents a temperature measured by the temperature sensor.

27. A method for controlling a switch with a parallel connected free-wheeling diode in a power converter, the method comprising:
  operating the power converter in a loaded condition, wherein operating the power converter in the loaded condition comprises:
    determining a measured quantity representative of a power efficiency of the power converter, and
    dynamically varying a switching slope dI/dt of the switch with the parallel connected free-wheeling diode based on the measured quantity, wherein
      the switching slope dI/dt of the switch with the parallel connected free-wheeling diode is dynamically varied in order to approach a first power efficiency optimum point of the power converter with respect to the switching slope dI/dt of the switch with the parallel connected free-wheeling diode, and
      dynamically varying the switching slope dI/dt of the switch with the parallel connected free-wheeling diode adjusts a magnitude of recovered charges dissipated in the free-wheeling diode;
  operating the power converter in an idling condition, wherein operating the power converter in an idling condition comprises:
    determining the measured quantity representative of the power efficiency of the power converter, and
    dynamically varying the switching slope dI/dt of the switch with the parallel connected free-wheeling diode based on the measured quantity, wherein
      the switching slope dI/dt of the switch with the parallel connected free-wheeling diode is dynamically varied in order to approach a second power efficiency optimum point of the power converter with respect to the switching slope dI/dt of the switch with the parallel connected free-wheeling diode; and
  wherein the first power efficiency optimum point is different from the second power efficiency optimum point.

28. The method of claim 27, wherein the measured quantity is a ratio of the power received as an input by the power converter to the power provided at an output by the power converter.

29. The method of claim 27, wherein the measured quantity represents a temperature measured by a sensor placed close to the power converter.

30. The method of claim 27, wherein:
  the method is performed in successive iterations, and
  the switching slope dI/dt is modified by one increment and the measured quantity is determined for each iteration.

31. The method of claim 27, wherein:
  the switch with the parallel connected free-wheeling diode comprises a plurality of switches with a plurality of parallel connected free-wheeling diodes, and
  the method is performed for the plurality of switches with the plurality of parallel connected free-wheeling diodes.

* * * * *